May 15, 1956  H. KONET ET AL  2,745,288
SERVO SYSTEM
Filed April 9, 1951

INVENTORS
HENRY KONET
CHARLES E. HURLBURT
BY
ATTORNEY

# United States Patent Office 2,745,288
Patented May 15, 1956

2,745,288

SERVO SYSTEM

Henry Konet, Hohokus, and Charles E. Hurlburt, Teaneck, N. J., assignors to Bendix Aviation Corporation, Teterboro, N. J., a corporation of Delaware Application April 9, 1951, Serial No. 220,034

9 Claims. (Cl. 74—5.47)

The invention relates to control systems, and more particularly to a control system in which a driving means responds with a high degree of accuracy to a condition.

The main object of the present invention is to provide a control system in which a device for detecting the condition is not loaded or coerced by the driving means.

Another object is to provide a relatively simple control system which requires only a single thyratron tube for controlling the driving means and does not employ relays or other similar current-interrupting means.

Another object is to provide a gyroscope with means for precessing the spin axis of the gyroscope to a predetermined attitude and utilizing a novel control system constructed according to the invention.

Another object is to provide a gyroscope with an erecting system in which the attitude detector is not coerced.

The invention contemplates a control system having driving means, such as a motor, energized by a power source to drive the motor in one direction. A control circuit responsive to a condition energizes the motor and drives the motor in the opposite direction in opposition to the power source. The control circuit may include a single thyratron tube which is fired by means responsive to the condition.

The foregoing and other objects and advantages of the invention will appear more fully hereinafter from a consideration of the detailed description which follows, taken together with the accompanying drawings wherein two embodiments of the invention are illustrated. It is to be expressly understood, however, that the drawings are for the purposes of illustration and description only, and are not to be construed as defining the limits of the invention.

Figure 1:
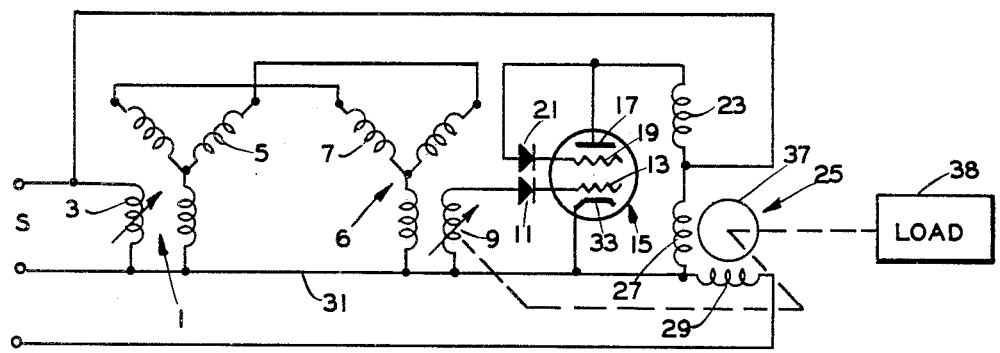
Figure 2:
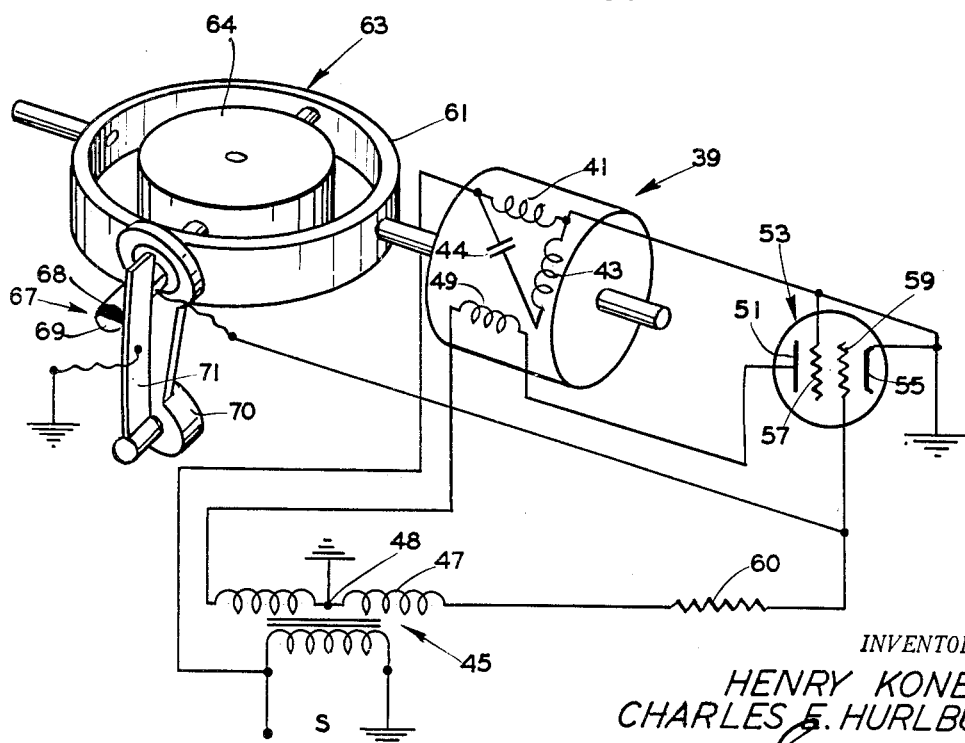

In the drawings, Figure 1 is a schematic wiring diagram of a control system constructed according to the invention; and Figure 2 is a schematic diagram of a gyroscope showing the control system applied thereto for precessing the gyroscope about one of its axes to a predetermined attitude.

Referring now to the drawings for a more detailed description of the novel control system of the present invention, the control system is shown in Figure 1 as comprising a transmitter inductive device 1 having a single phase rotor winding 3 connected across an alternating current source S and a three-phase stator winding 5 inductively coupled thereto. A receiver inductive device 6 has a three-phase stator winding 7 connected to stator winding 5 of transmitter device 1 and a single phase rotor winding 9 connected through a rectifier 11 to the control grid 13 of a thyratron tube 15. The plate 17 and screen grid 19 of thyratron tube 15 are connected together through a rectifier 21.

A two-phase reversible motor 25 has a pair of windings 27, 29 connected across the two phases of source S which may be either a three-phase supply as shown in Figure 1 or appropriately phased by a condenser to a single-phase supply as shown in Figure 2. The motor also has an auxiliary winding 23 connected in the plate circuit of thyratron tube 15. A common lead 31 connects rotor winding 3 and stator winding 5 of inductive device 1, stator winding 7 and rotor winding 9 of inductive device 6, indirectly heated cathode 33 of thyratron tube 15 and windings 27, 29 of motor 25 to the common terminal of alternating current source S. Rotor 37 of motor 25 may be drivably connected to a load 38 of any suitable kind and to rotor 9 of inductive device 6 to provide a follow-up signal.

When receiver 6 is not in electrical coincidence with transmitter 1, a signal appears upon the grid 13 of thyratron tube 15. When the receiver is to one side of electrical coincidence with the transmitter, the signal is out of phase with the voltage impressed on plate 17 of thyratron tube 15 through motor winding 23. The thyratron tube will not fire under these conditions, and motor winding 23 is de-energized. Windings 27, 29 of the motor produce a torque to rotate rotor 37 in a direction to drive the receiver toward electrical coincidence with the transmitter.

When the receiver is to the other side of electrical coincidence with the transmitter, the signal is in phase with the plate voltage, and under these conditions, the thyratron tube fires and energizes auxiliary motor winding 23. Winding 23 cooperates with winding 29 to create a torque greater than and opposite to the torque created by windings 27, 29 and the armature is driven in the opposite direction and drives the receiver toward coincidence with the transmitter.

When the thyratron tube fires, rectifier 11 in the grid circuit maintains the grid current at a negligible value to prevent loading and coercing of the transmitter. A conventional coupling condenser and grid resistor, not shown, may also be used. The motor drives the receiver toward coincidence with the transmitter in either direction and equilibrium is reached when the thyratron passes current of sufficient value so that the torque developed by motor windings 23, 29 is equal and opposite to the torque developed by motor windings 27, 29. This is accomplished by a small phase shift in receiver 6 of the grid voltage relative to the plate voltage which causes thyratron tube 15 to fire for a portion of each cycle. Oscillation of the motor is prevented by a feedback from thyratron plate 17 through rectifier 21 to screen grid 19.

In Figure 2, the control system is used to precess the spin axis of the gyroscope 63 to a predetermined attitude in response to a vertical detector shown as a pendulum 70. The system includes a reversible two-phase motor 39 having a pair of field windings 41, 43 connected across an alternating current source S. A phasing condenser 44 is connected between windings 41, 43. The motor also includes an auxiliary winding 49 connected to plat 51 of a thyratron tube 53 and to a center-tapped secondary winding 47 of a transformer 45. The center-tap 48 of winding 47 is connected to ground.

Cathode 55 and screen grid 57 of thyratron tube 53 are connected together to ground and to windings 41, 43 of motor 39. Control grid 59 of thyratron tube 53 is connected through a high resistance 60 to secondary winding 47 of transformer 45. Motor 39 is drivably connected to a gimbal 61 of gyroscope 63 to precess the spin axis of the gyroscope to a predetermined attitude about one control axis. A casing 64 of gyroscope 63 mounts a segmental switch 67 having one-half portion 68 of insulating material and the other half portion 69 of conducting material connected to control grid 59 of thyratron tube 53. A brush 71, connected to ground, engages segmental switch 67 and is mounted on pendulum 70 pivotally mounted on the gyroscope.

When the spin axis of the gyroscope departs from its predetermined attitude in one direction about the control axis, brush 71 engages insulated portion 68 of segmental switch 67 and control grid 59 of thyratron 53 is disconnected from ground and receives a voltage from secondary 47 of transformer 45 which is out of phase with the voltage impressed on plate 51 of the thyratron tube through auxiliary winding 49 of the motor. Under these conditions, the thyratron tube does not fire and auxiliary winding 49 is de-energized, and the constant voltages energizing windings 41, 43 of motor 39 provide a torque on gimbal 61 in a direction to precess the gyroscope to its predetermined attitude.

When the gyroscope departs from its predetermined attitude in the opposite direction about the control axis, brush 71 engages conducting portion 69 of segmental switch 67 to ground control grid 59. Under these conditions, the thyratron tube fires and plate current flows through auxiliary winding 49 so that the torque created by auxiliary winding 49 and winding 43 of motor 39 is greater than and opposite to the torque created by winding 41 and 43 and the motor precesses the gyroscope to its predetermined attitude. Oscillation of the gyroscope about the predetermined attitude is eliminated by the integrating effect of the gyroscope and the slow erection rate.

While the gyroscope has been shown with a system for erecting the spin axis of the gyroscope about only one axis, it should be understood that the invention contemplates using a similar system for erecting the spin axis of the gyroscope about an axis at right angles to the axis referred to.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a system of the kind described, an alternating power source, a two-phase reversible motor having a pair of windings both connected directly to and uniformly energized by said power source and having an auxiliary winding, said motor being driven in one normal direction by said power source, and a control circuit connected to said auxiliary winding and including means responsive to one condition for energizing the auxiliary winding to drive said motor in the opposite direction and responsive to another condition to de-energize the auxiliary winding and drive the motor in said normal direction.

2. In a system of the kind described, an alternating current source, a two-phase reversible motor having a pair of windings connected directly to and energized by said alternating current source and having an auxiliary winding, said motor being driven in one direction by said current source, a control circuit including a single thyratron tube connected to said auxiliary winding, and means responsive to a condition to fire the thyratron tube and energize the auxiliary winding to drive said motor in the opposite direction.

3. In a system of the kind described, an alternating current source, a two-phase reversible motor having a pair of windings connected directly to and energized by said alternating current source and having an auxiliary winding, said motor being driven in one direction by said current source, and a control circuit including a single thyratron tube connected to said auxiliary winding, and an alternating current signal generator including transmitter and receiver devices responsive to a condition and connected to said thyratron tube to fire said thyratron tube and energize the auxiliary winding to drive said motor in the opposite direction.

4. In a system of the kind described, driving means energized by a power source and driven in one direction thereby, a control circuit including a single thyratron tube having a plate connected to said driving means and a control grid, means for impressing on the control grid a biasing potential to prevent firing of said thyratron tube, and switching means responsive to a condition and adapted to change the biasing potential on said thyratron tube to fire said thyratron tube and energize said driving means for operation in the opposite direction.

5. Means for maintaining the spin axis of a gyroscope in a predetermined attitude comprising a motor for precessing the gyroscope adapted to be energized by an alternating current source and driven in one direction thereby when the spin axis moves to one side of the predetermined attitude, a control circuit connected to said motor and including a single thyratron tube having a plate energized by an alternating power source and a control grid, means for impressing on the control grid of said thyratron tube an alternating voltage of opposite phase to the plate voltage to prevent said thyratron tube from firing when said spin axis is to said one side of said predetermined attitude, switching means adapted to ground the control grid of said thyratron tube to fire said thyratron tube and energize said motor for rotation in the opposite direction, and gravity responsive means operating said switching means when the spin axis moves to the other side of said predetermined attitude.

6. A control system, comprising an alternating power source, a two-phase reversible motor having two windings, both continuously connected to and uniformly energized by said source, arranged to operate said motor in one direction of rotation; an auxiliary motor winding arranged in opposition to, and having higher inductance than, one of said two windings, and means for energizing said auxiliary winding while said two windings are fully energized and thereby operating said motor in the other direction of rotation.

7. A gyro control system comprising a gyro having a predetermined attitude, and means for continuously precessing the gyro alternately in opposite directions from said attitude, comprising a motor having continuously energized winding means for precessing the gyro in one direction and auxiliary winding means for precessing the gyro in the opposite direction; and means including a gravity operated switch for periodically energizing said auxiliary winding means when the gyro has passed its predetermined attitude in said one direction and deenergizing said auxiliary winding means when the gyro has passed said attitude in the other direction.

8. A gyro control system comprising a gyro having a predetermined attitude, and means for continuously precessing the gyro alternately in opposite directions from said attitude, comprising a motor having continuously energized winding means for precessing the gyro in one direction, and auxiliary winding means for precessing the gyro in the opposite direction; and means including a gravity operated switch for periodically energizing said auxiliary winding means when the gyro has passed its predetermined attitude in said one direction and deenergizing said auxiliary winding means when the gyro has passed said attitude in the other direction, said periodically energizing means comprising a thyratron having an output circuit connected to said auxiliary winding and a firing circuit actuated by said switch.

9. A gyro control system comprising a gyro having a predetermined spin axis attitude and a pivotal mounting including a rocking member, and means for continuously precessing the gyro alternately in opposite directions from said attitude about said mounting and for oscillating said rocking member, comprising a motor having continuously energized winding means for precessing the gyro in one direction, and auxiliary winding means for precessing the gyro in the opposite direction, and means including a gravity operated switch for periodically energizing said auxiliary winding means when the gyro has passed its predetermined attitude in said one direction and deenergizing said auxiliary winding means when the gyro has passed said attitude in the other direction, said energizing means including a gravity operated switch having contacts connected to and actuated by said rocking member.

References Cited in the file of this patent

UNITED STATES PATENTS

| | | |
|---|---|---|
| 2,191,997 | Side | Feb. 27, 1940 |
| 2,349,963 | Harrison | May 30, 1944 |
| 2,367,465 | Kunzer | Jan. 16, 1945 |
| 2,386,176 | White | Oct. 9, 1945 |
| 2,392,370 | Esval et al. | Jan. 8, 1946 |
| 2,411,357 | | |
| 2,446,180 | | |
| 2,486,935 | | |
| 2,528,487 | | |
| 2,529,490 | | |
| 2,553,786 | | |
| 2,565,876 | | |

| | | |
|---|---|---|
| | Bertram | Nov. 19, 1946 |
| | Haskins | Aug. 3, 1948 |
| | Fanta | Nov. 1, 1949 |
| | Adkins | Nov. 7, 1950 |
| | Field | Nov. 14, 1950 |
| | Redemske | May 22, 1951 |
| | Nicholson | Aug. 28, 1951 |

FOREIGN PATENTS

| | | |
|---|---|---|
| 522,130 | Great Britain | June 10, 1940 |